Figure 1:
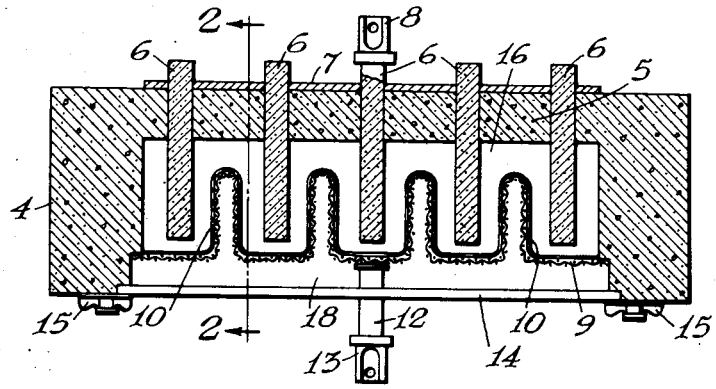

June 12, 1951  R. I. THRUNE  2,556,830
GRAPHITE ANODE
Filed Jan. 20, 1947

INVENTOR.
Richard I. Thrune
BY
Griswold & Burdick
ATTORNEYS

Patented June 12, 1951

2,556,830

UNITED STATES PATENT OFFICE 2,556,830

GRAPHITE ANODE

Richard I. Thrune, Midland, Mich., assignor to The Dow Chemical Company, Midland, Mich., a corporation of Delaware Application January 20, 1947, Serial No. 722,982

6 Claims. (Cl. 204—294)

The invention relates to molded articles comprising graphite. It more particularly concerns an improved molded article comprising graphite especially useful as an anode in electrolytic cells such as those used in chlorine manufacture in which an aqueous solution of a chloride is electrolyzed.

One of the methods heretofore proposed for making articles comprising graphite consists in mixing together graphite powder and a minor amount of a bonding agent of a thermo-setting phenol-formaldehyde resin and then molding the mixture to the desired shape by the application of heat and pressure for a time sufficient to set the resin. This method, although advantageous as regards availability of the raw materials and ease of fabrication when applied to the making of some graphite articles, is unsatisfactory when applied to the making of chlorine cell anodes for anodes made in this way are so shortlived in conventional chlorine production as not to be commercially acceptable for such use.

Accordingly, it is the principal object of the invention to provide an improved graphite article, formed from a mixture of graphite particles and a bonding agent of a thermo-setting phenol-formaldehyde resin, which has a long useful life as an anode in an electrolytic chlorine cell. Other objects and advantages will appear as the description of the invention proceeds.

I have discovered that by including in the mixture of the graphite and the thermo-setting phenol-formaldehyde resin, which is molded into anodes, a modifying agent of a triparatertiary butyl aryl phosphate wherein the aryl radicals are of the benzene series selected from the group consisting of tri-(para-tertiary-butyl-phenyl) phosphate,

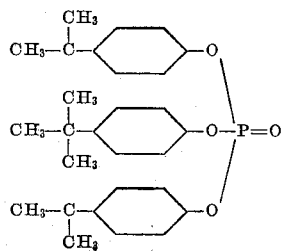

and di-(para-tertiary-butyl-phenyl) mono-(5-tertiary-butyl-2-xenyl) phosphate,

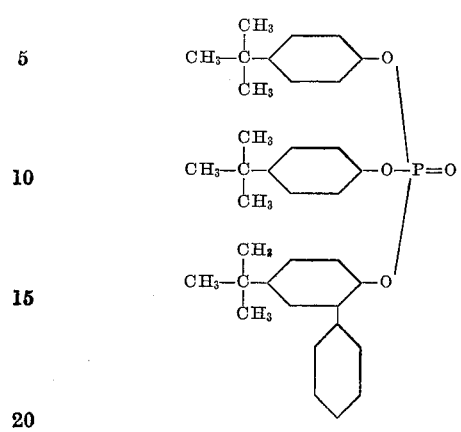

disadvantages accruing to the proposed method are overcome.

The invention, then, consists of the graphite article and method of making the same hereinafter fully described and particularly pointed out in the claims.

The new graphite article according to the invention consists essentially of a molded body of graphite particles bonded together with a thermo-set resin of phenol-formaldehyde, the graphite and resin having associated therewith one of the aforementioned modifying agents.

Various phenol-formaldehyde resins that are capable of thermo-setting may be used as the bonding agent.

If desired, the bonding agent may be prepared directly from a suitable mixture of phenol and formaldehyde with the aid of a catalyst so as to yield the thermo-setting form of the phenol-formaldehyde resin as is known in the art. For example, ordinary commercial phenol which is anhydrous, or nearly so, may be used by reacting it with ordinary aqueous formaldehyde which contains about 37 per cent by weight of formaldehyde. Suitable proportions of formaldehyde to employ relative to phenol are from about 1.2 to 2 mols reckoned as $CH_2O$, for each mol of phenol, reckoned as $C_6H_5OH$. A preferred range of proportions is about 1.3 to 1.6 mols of formaldehyde for each mol of phenol. In reacting mixtures of phenol and formaldehyde in the foregoing proportions, the mixtures contain the water which is present in the phenol and formaldehyde employed, and, if necessary, sufficient additional water may be added to bring the ratio of mols of water per mol of formaldehyde, reckoning water as $H_2O$, within the range of about 4.3 to 1.4. Good results are obtained when the mol ratio of water to formaldehyde in the reacting mixture is between about 2.25 and 3.25, the preferred ratio being about 2.85. A suitable catalyst capable of promoting the reaction (condensation) of phenol with formaldehyde is used in catalyzing amounts. For this purpose, there may be used a mineral acid or one of the alkalies, commercial flaked caustic soda being preferred which usually contains about 96 per cent of sodium hydroxide (NaOH). In the case of NaOH, effective amounts are about 0.03 to 0.07 mol of NaOH per mol of formaldehyde.

To bring about the formation of the thermosetting resin, the phenol, formaldehyde, and catalyst in the foregoing proportions are charged into a suitable reaction vessel, such as an iron vat provided with an agitator, a vented water-cooled reflux condenser, and means for either heating or cooling the charge. The charge is then continuously agitated and heat is supplied to it to raise its temperature to between about 40° and 80° C., thereby inducing the ingredients of the charge to react, the reaction being exothermic. The temperature of the charge is maintained within the reacting range as by continuing the application of heat, if the exothermic heat is insufficient to maintain the temperature, or by cooling to remove exothermic heat, if necessary, as when the batches are relatively large. The length of time the charge is maintained at a temperature within the foregoing range may be determined by the viscosity of the charge which increases as the reaction proceeds, although substantially none of the water in the charge escapes, as water vapor produced is condensed and returned to the reaction vessel by the reflux condenser. The viscosity is not permitted to exceed about 100 and preferably not over 50 centipoises measured at 15° C. The rate at which the viscosity begins to increase is greater the higher the temperature of the reaction. At 80° C., for example, the viscosity approaches the limiting value in about 2 hours, while at 50°, the reaction may proceed for 4 or 5 hours before reaching the limiting value. A preferred temperature at which to maintain the charge is between about 50° and about 60° or 70° C. for from 4 to 6 hours before cooling to room temperature (30° C. or below). As soon as the viscosity approaches the limiting value, the reaction is arrested by cooling the charge to room temperature or below about 30° C. The cooled charge is maintained at about 25° to 30° C. while supplying heat thereto under an absolute pressure not exceeding about 1 inch of mercury so as to evaporate off the excess water, the evaporation being continued preferably until not more than about 5 to 10 per cent of the water in the charge remains. The resulting resin has a viscosity of about 400 to 600 centipoises and is ready for use. If desired, the resin may be dried further until it becomes a fusible solid (i. e. a casting resin), and the latter used in solution in a solvent such as acetone.

In making the article or anode, the ingredients, viz., the graphite (as a powder), thermo-setting phenolformaldehyde resin binder, and modifying agent are mixed together and then the mixture is molded to a suitable form while thermally setting the binder. The amount of the thermosetting resin to use in the mixture is between about 9 to 20 per cent, or preferably about 16 per cent, and that of the modifying agent about 0.75 to 1.5 per cent of the weight of the mixture. In preparing the mixture, the ingredients in the above proportions are charged into a suitable mixer, such as a ball mill, and subjected to intense mixing for a time sufficient to produce a uniform mixture, an operation which usually requires as much as about 60 minutes. If desired, a minor amount (e. g. about 1 to 2 per cent) of a solvent for the modifying agent, such as carbon tetrachloride, may be added during the mixing operation to facilitate the distribution of the modifying agent throughout the mixture. The solvent may be permitted to evaporate so that it does not remain in consequential amount in the mixture after mixing is complete.

The resulting mixture is pressed into rough preforms and is then shaped as desired into anodes by charging the preforms into dies of the desired dimensions, and applying pressure and heat for a time sufficient to set the resin binder. It is frequently desirable to vent or "flash" the die during the processing. Molding pressures of 1 to 20 tons per square inch, mold temperature of 150° to 180° C., and curing times of 4 to 6 minutes are customary. After the cure is completed, the die is opened and the molded anode may be ejected in a form ready for use.

The anode members may be prepared in any desired shape, and used to replace, wholly or in part, the ordinary graphite members forming the anode structure in electrolytic cells. The new anodes are particularly advantageous in aqueous chloride-caustic soda cells, such as mercury cells or permeable diaphragm cells because of their high apparent density (1.95–2.09), low porosity, and resistance to chlorine solutions.

The molded anodes of the invention are electrically anisotropic, having a moderate ohmic resistance in a direction parallel to the direction of the application of pressure during the molding operation, but a much lower resistance in planes perpendicular to this direction. For this reason, the anodes are especially adapted to use in chlorine-caustic soda cells in which the anode structure comprises a long, thin leaf or board. In molding such leaves, the die is designed and the pressure applied so that the resulting anode leaf has its lowest resistance in the directions of its two greatest linear dimensions.

Figure 2:
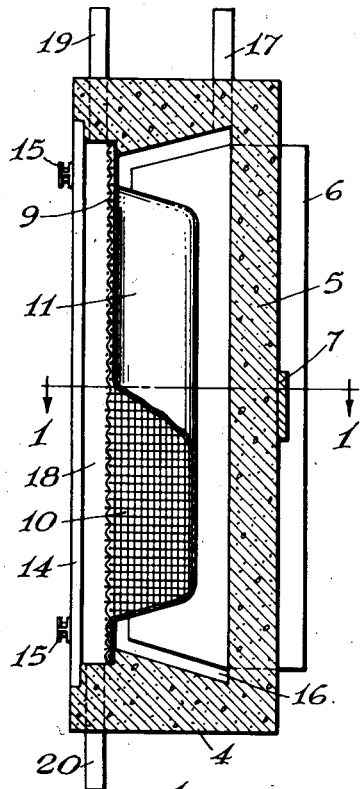
Figure 3:
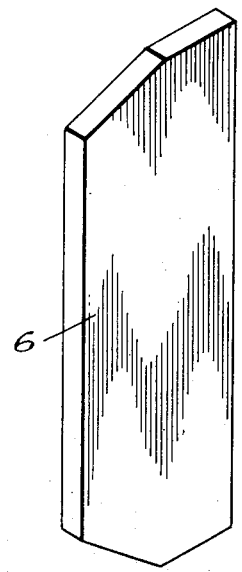

The invention may be further explained with reference to the accompanying drawings in which Fig. 1 is a horizontal section through a chlorine-caustic soda cell utilizing anodes prepared according to the invention, taken along the line 1—1 in Fig. 2;

Fig. 2 is a vertical section of the same cell, taken along the line 2—2 of Fig. 1; and Fig. 3 is a perspective view of one of the anode leaves used in the cell of Figs. 1 and 2.

The cell illustrated consists of a hollow frame 4 of reinforced concrete, provided with a concrete partition 5 across one face thereof. Embedded in and extending through the partition 5 are a number of anode leaves 6, shown in detail in Fig. 3, molded of graphite power and a minor proportion of a phenol-aldehyde thermoset resin, together with at least one of the aforesaid modifying agents, according to the process described, preferably in such manner that the planes of lowest ohmic resistance are parallel to the two longest dimensions. As shown, these leaves are all parallel and are transverse of the cell frame, forming an anode structure consisting of a series of pockets. The anode leaves 6 are inter-connected electrically outside the frame by a bus-bar 7, on which is mounted a terminal 8 by which the cell can be connected to a source of electric current.

The cell also includes a cathode structure 9 mounted in the frame 4, consisting of a metal screen or other perforated metal element folded to form a series of fins 10, which are adapted to fit into the pockets between the anode leaves 6, and are closed at top and bottom by sealing compound. The entire cathode structure is covered on the anode side by a permeable diaphragm 11, usually of asbestos paper, and may be connected to a source of current by means of a lead 12 and a terminal 13. The cell is closed by a removable partition 14 mounted in the frame 4 behind the cathode structure 9, and held in place by clamps 15.

The space between the cathode structure 9 and the anode leaves 6 serves as an anode chamber 16, into which brine may be introduced and chlorine removed through a pipe 17. The space between the cathode screen 9 and the removable partition 14 serves as a cathode chamber 18, and is provided at the top with a vent 19 and at the bottom with a drain 20.

In operation, the anode chamber 16 is maintained full of brine, and electric current is supplied through the terminals 8 and 13. Chlorine gas deposits on the anode leaves 6, and may be exhausted through the pipe 17 to a suitable collecting system. The brine diffuses through the diaphragm 11 and comes into contact with the cathode fins 10, where it is converted to caustic soda solution, which runs out through the drain 20, and hydrogen gas, which escapes through the vent 19.

In comparison with similar anodes molded from graphite powder and thermo-setting phenolformaldehyde resin binder in the proportions already given but without including any one of the aforesaid modifying agents, the new anodes exhibit greatly increased life in use in the electrolytic chlorine cell.

The following example is illustrative of the invention.

(a) Preparation of the thermo-setting phenolformaldehyde resin binder: 300 pounds of phenol, 375 pounds of formaldehyde solution containing 37 per cent of $CH_2O$ by weight, and 7.3 pounds of caustic soda were mixed together and the mixture maintained in an agitated condition for 6 hours at 60° C. in an open reaction vessel. The reaction mixture was then cooled to 25°–30° C. and maintained within these temperature limits while being subjected to an absolute pressure of 1 inch of mercury and supplied with heat, thereby removing water as vapor from the reaction mixture. This procedure of removing water was discontinued when the water content of the reaction mixture was reduced to between about 5 and 10 per cent of the weight of the mixture.

(b) Preparation of molding mixture: Graphite powder, mostly passing a 200 mesh standard sieve, was mixed with phenol-formaldehyde resin binder, prepared as above, in the proportions of 84 parts of graphite to 16 parts of binder and, to each 100 parts of the mixture, there was admixed 1 part of one of the aforementioned modifying agents.

(c) Molding procedure: An anode in the form of a plate 1 inch thick was molded by charging the requisite quantity of the molding mixture prepared as above into a steel die mold heated to between about 150° and 170° C. After the mold was filled, the mold was closed for about 5 seconds and then opened to permit the escape of gases thereby produced (flashing). The mold was then closed and a pressure of about 4000 pounds per square inch exerted upon the molding mixture for 5 minutes, thereby curing the resin binder and giving final shape to the mixture. The mold was then opened and the molded graphite plate thus obtained removed. A number of anodes were prepared in this way.

(d) For comparison, a number of exactly similar anodes were prepared following each of the same procedures as described under (a), (b), and (c) above, except that modifying agent was included in the molding mixture of (b).

(e) Testing the anodes for service life in chlorine-producing cells.

A chlorine-producing cell was equipped with two sets of anodes prepared as described under (a), (b), and (c). In the first of the sets, the molding mixture contained 1 per cent of tri-(para-tertiary-butyl-phenyl) phosphate as a modifying agent. In the second set, the modifying agent was 1 per cent of di(para-tertiary-butyl-phenyl) mono-(5-tertiary-butyl-2-xenyl) phosphate. Each of the anodes were connected in parallel in the cell as in the construction shown in the drawing wherein numeral 6 represents the anodes and 7 the bus connecting them in parallel. A similar cell was constructed in similar manner using comparison anodes made as described under (d).

The cell having anodes containing a modifying agent in accordance with the invention was operated in the same manner and for the same length of time as the cell containing the comparison anodes, both cells being run for 88 days before dismantling for inspection. Upon inspection, it was found that all the comparison anodes had been completely destroyed while all the anodes containing a modifying agent were still in serviceable condition and had a remaining service life of at least 90 days.

I claim:

1. In a molded graphite article the particles of which are bonded with a thermo-setting phenolformaldehyde resin in a proportion of about 9 to 20 per cent by weight, the improvement which comprises including therein from 0.75 to 1.5 per cent by weight of a modifying agent of a triparatertiary butyl aryl phosphate wherein the aryl radicals are of the benzene series selected from the group consisting of tri-(para-tertiary-butylphenyl) phosphate, and di-(para-tertiary-butylphenyl) mono-(5-tertiary-butyl-2-xenyl) phosphate.

2. In a molded graphite article the particles of which are bonded with a thermo-setting phenolformaldehyde resin in a proportion of about 9 to 20 per cent by weight, the improvement which comprises including therein from 0.75 to 1.5 per cent by weight of a modifying agent consisting of tri-(para-tertiary-butyl-phenyl) phosphate.

3. In a molded graphite article the particles of which are bonded with a thermo-setting phenolformaldehyde resin in a proportion of about 9 to 20 per cent by weight, the improvement which comprises including therein from 0.75 to 1.5 per cent by weight of a modifying agent consisting of di-(para-tertiary-butyl-phenyl) mono-(5-tertiary-butyl-2-xenyl) phosphate.

4. An anode adapted to be used in an electrolytic cell consisting essentially of a molded body of graphite bonded together with a thermo-set phenol-formaldehyde resin in a proportion of about 9 to 20 per cent by weight, said molded body having dispersed therethrough from 0.75 to 1.5 per cent by weight of a modifying agent of a tri-para-tertiary butyl aryl phosphate wherein the aryl radicals are of the benzene series selected from the group consisting of tri-(para-tertiary-butyl-phenyl) phosphate, and di-(para-tertiary-butyl-phenyl) mono-(5-tertiary-butyl-2-xenyl) phosphate.

5. An anode adapted to be used in an electrolytic cell consisting essentially of a molded body of graphite bonded together with a thermo-set phenol-formaldehyde resin in a proportion of about 9 to 20 per cent by weight, said molded body having dispersed therethrough from 0.75 to 1.5 per cent by weight of a modifying agent of tri-(para-tertiary-butyl-phenyl) phosphate.

6. An anode adapted to be used in an electrolytic cell consisting essentially of a molded body of graphite bonded together with a thermo-set phenol-formaldehyde resin in a proportion of about 9 to 20 per cent by weight, said molded body having dispersed therethrough from 0.75 to 1.5 per cent by weight of a modifying agent of di-(para-tertiary-butyl-phenyl) mono-(5-tertiary-butyl-2-xenyl) phosphate.

RICHARD I. THRUNE.

REFERENCES CITED

The following references are of record in the file of this patent:

UNITED STATES PATENTS

| Number | Name | Date |
|---|---|---|
| 779,733 | Price | Jan. 10, 1905 |
| 867,319 | Stubbs | Oct. 1, 1907 |
| 1,779,242 | Laubi | Oct. 21, 1930 |
| 1,797,805 | Suchy | Mar. 24, 1931 |
| 1,856,371 | Baldwin | May 3, 1932 |
| 2,224,847 | Bass | Dec. 17, 1940 |
| 2,326,000 | Teeple | Aug. 3, 1943 |
| 2,360,645 | Bruce | Oct. 17, 1944 |
| 2,395,676 | Luth | Feb. 26, 1946 |
| 2,453,174 | Wright | Nov. 9, 1948 |

FOREIGN PATENTS

| Number | Country | Date |
|---|---|---|
| 781,175 | France | Feb. 18, 1935 |

OTHER REFERENCES

Ser. No. 326,756, Ott (A. P. C.), published May 18, 1943.